US008077083B2

(12) United States Patent
Blake

(10) Patent No.: US 8,077,083 B2

(45) Date of Patent: Dec. 13, 2011

(54) DEPLOYABLE ANTENNA SYSTEM

(75) Inventor: Trevor Martin Blake, Chelmsford (GB)

(73) Assignee: BAE Systems plc, London (GB)

( * ) Notice: Subject to any disclaimer, the term of this patent is extended or adjusted under 35 U.S.C. 154(b) by 0 days.

(21) Appl. No.: 11/887,881

(22) PCT Filed: Jul. 12, 2007

(86) PCT No.: PCT/GB2007/050397

§ 371 (c)(1), (2), (4) Date: Aug. 12, 2009

(87) PCT Pub. No.: WO2008/007143

PCT Pub. Date: Jan. 17, 2008

(65) Prior Publication Data

US 2009/0303124 A1 Dec. 10, 2009

(30) Foreign Application Priority Data

Jul. 14, 2006 (EP) .................................... 06253698
Jul. 14, 2006 (GB) .................................. 0614093.3

(51) Int. Cl.
*G01S 19/51* (2010.01)
*H01Q 3/02* (2006.01)

(52) U.S. Cl. ............... 342/357.34; 342/357.62; 342/368

(58) Field of Classification Search ............. 342/357.34, 342/368, 357.52, 357.56, 357.62; *G01S 19/14, G01S 19/18, 19/23, 19/51; H01Q 3/00, 3/02*
See application file for complete search history.

(56) References Cited

U.S. PATENT DOCUMENTS

| | | | | |
|---|---|---|---|---|
| 5,623,270 | A | 4/1997 | Kempkes et al. | |
| 5,767,804 | A * | 6/1998 | Murphy | 342/357.31 |
| 5,896,105 | A * | 4/1999 | Murphy et al. | 342/368 |
| 6,130,642 | A * | 10/2000 | Woodall et al. | 342/357.29 |
| 6,141,880 | A | 11/2000 | Vircks et al. | |
| 6,618,002 | B1 * | 9/2003 | Perry | 342/107 |
| 6,828,935 | B1 * | 12/2004 | Dunn et al. | 342/375 |
| 6,844,849 | B1 * | 1/2005 | Barrick et al. | 342/372 |
| 2002/0181565 | A1 * | 12/2002 | Boyd et al. | 375/152 |
| 2003/0210179 | A1 * | 11/2003 | Dizaji et al. | 342/159 |

FOREIGN PATENT DOCUMENTS

| | | | |
|---|---|---|---|
| GB | 2302990 | A * | 2/1997 |
| GB | 2357918 | | 7/2001 |
| GB | 2382481 | | 5/2003 |
| GB | 2412029 | | 9/2005 |

(Continued)

OTHER PUBLICATIONS

"Surface-Wave Radar and its Applications," Ronold W.P. King, IEEE Transactions on Antennas and Propagation, vol. 51, No. 10, Oct. 2003, pp. 3000-3002.*

(Continued)

*Primary Examiner* — Thomas Tarcza
*Assistant Examiner* — John Vigushin
(74) *Attorney, Agent, or Firm* — Kenyon & Kenyon LLP

(57) ABSTRACT

A rapidly deployable HF surface wave radar phased array antenna system is provided, including a plurality of separate antenna elements that are relatively movable to desired spaced apart positions, each antenna element including a respective receiver for receiving HF radio signals, wherein, in order to determine and control properties of the radar system, each element includes a GPS receiver for determining the location of each element and for timing and frequency synchronization.

7 Claims, 3 Drawing Sheets

FOREIGN PATENT DOCUMENTS

| | | |
|---|---|---|
| WO | WO 2004/042869 | 5/2004 |

OTHER PUBLICATIONS

"A Rapidly Deployable Wireless Networking System" by Scott Raynel, WAND Research Group, University of Waikato, Tauranga, New Zealand, Final Report for COMP420-05Y, Oct. 28, 2005, pp. 1-40 (relevant pp. 11-14 and 26-28).*

International Search Report, Oct. 24, 2007, from International Patent Application No. PCT/GB2007/050397.

Blake, T.M., "Development of a rapidly re-deployable HF radar concept" Electromagnetic Remote Sensing (EMRS) Defense Technology Center (DTC), May 20, 2004.

European Patent Office, International Preliminary Report on Patentability and Written Opinion, Jan. 14, 2009, from International Patent Application No. PCT/GB2007/050397, filed on Jul. 12, 2007.

U.K. Patent Office, Search Report, Nov. 6, 2006, from related UK Patent Application No. GB 0614093.4, filed Jul. 14, 2006.

European Patent Office, Extended Search Report, Feb. 28, 2007, from related European Patent Application No. EP06270055.4, filed Jul. 14, 2006.

* cited by examiner

DEPLOYABLE ANTENNA SYSTEM

RELATED APPLICATION INFORMATION

This application is a United States National Phase patent application of, and claims the benefit of, International Patent Application No. PCT/GB2007/050397 which was filed on Jul. 12, 2007, and which claims priority to British Patent Application No. 0614093.3, which was filed on Jul. 14, 2006 and European Patent Application No. 06253698.2, which was filed on Jul. 14, 2006, the disclosures of each of which are incorporated herein by reference.

FIELD OF THE INVENTION

The present invention relates to a deployable antenna system, particularly though not exclusively, an HF radar phased array antenna system that is adapted for rapid deployment.

BACKGROUND INFORMATION

In "Deployment of a rapidly re-deployable HF radar concept", T. M. Blake, Electro-Magnetic Remote Sensing (EMRS) Defence Technology Centre (DTC) 1st Annual Technical Conference 20-21st May 2004, there is disclosed an HF surface wave radar system as shown in FIG. 1, comprising a linear array of separate spaced apart (7 meter spacing) receive antenna elements 2, each element being a vertical active antenna, 2.5 meters long. Each element includes a receiver 4 for processing received signals. The elements are connected in a daisy chain arrangement by digital data link cables 6 to a control centre 8, shown located in a van. A corresponding transmit antenna array 9 is also provided. The system is taken to a site in a disassembled state in the van, and then rapidly assembled by two technicians by placing the elements in the ground in spaced apart positions, and connecting them together by the data link cables.

By placing receivers at the base of the elements, difficulties arise in that the elements have to be synchronised in time, frequency and phase in order that the radar system function accurately. Further their position relative to one another needs to be known accurately, but since they are positioned by hand by technicians without scientific instruments to permit accurate placement, (desirably to within 0.1 meters) this is a further problem.

Whilst a wide variety of HF antenna arrays are known comprising a multiplicity of antenna elements, such elements are normally fixedly mounted together in a framework or other mounting arrangement—this would not be suitable for a rapidly deployable system, in particular where the elements are spaced a long distance apart.

SUMMARY OF THE INVENTION

From a first aspect, the present invention resides in a deployable antenna system, comprising a plurality of separate antenna elements which are relatively movable to desired spaced apart positions, each antenna element including respective RF processing means, and the antenna system further comprising radio location means for determining the location of each antenna element relative to other antenna elements of the system.

The present invention is particularly applicable to HF surface wave radar where it is usual to provide separate transmitter and receiver phased array antennae. In the case of a receive antenna, it may comprise a plurality of separate antenna elements spaced apart, each element in accordance with the invention including a respective receiver. A transmit antenna may comprise a single antenna element or a plurality of antenna elements spaced apart, and in the latter case each element includes a respective transmitter.

The invention may also be applicable to other types of radio and phased array radar systems, including VHF, HF skywave, DF broadcasting systems, radio astronomy systems.

Each antenna element may take any convenient form, and there is for HF a very wide range of possible antenna configurations, for example wire, dipole, circular, cube, delta, etc. For HF surface wave radar, it is common to employ vertical monopole antenna elements. In an alternative configuration, the elements may be disposed in a horizontal direction. Vertical elements may have a variety of types, for example collinear, helically wound, doubled over configurations.

In accordance with the invention, it is preferred to employ an active antenna to shorten the overall length of the antenna and to enable broadband reception (8-20 MHz). Active antennae are known, and employ an active electrical circuit which functions as an impedance buffer between the antenna and receiver, and enables an optimal matching of the antenna to the receiver input.

The radio location means may, in accordance with the invention, take a variety of forms. The principle of radio location is well known and there are many systems commercially available. As preferred a system is employed where a radio receiver or beacon/transmitter is mounted on each antenna element. A radio transmitter/receiver may be mounted in a master control unit for determining the positions of the antenna elements.

However as particularly preferred and in accordance with the invention, it is preferred to employ on the grounds of expense and accuracy, for each antenna element, a receiver of a satellite radio navigation system, commonly known as GNSS (Global Navigation Satellite Systems), including GPS, GLONASS and Galileo. This may provide the required degree of accuracy of location, and does not require expensive equipment for radio location to be installed at a central station of the antenna system.

Such receiver of a satellite radio navigation system may also be used for synchronisation purposes. In particular GPS provides a standard timing signal provided by an atomic clock, comprising pulses spaced 1 sec apart, with 100 nsec accuracy. This timing signal may be employed both to synchronise a clock and a local oscillator in each receiver of each antenna element. This avoids the need for having a master timing source and a master frequency source.

In a preferred embodiment, the antenna system further comprises a master control unit, wherein the master control unit and each of the plurality of antenna elements are provided with respective synchronisation means for synchronising at least one parameter of the respective RF processing means with the other RF processing means.

As preferred, the antenna elements are connected together and to the master control unit in a daisy chain arrangement by data link cables. Alternatively, a point-to-point radio link may be provided.

DETAILED DESCRIPTION

Embodiments of the present invention will now be described in more detail, and by way of example only, with reference to the accompanying drawings.

The preferred embodiment of the invention relates to a distribution, reference, synchronisation and calibration scheme for a phased array receiving system of an HF radar system. It simplifies installation of the phased array and enables rapid deployment and automatic synchronisation and calibration of the array. It has particular application to HF radar where phased array antennas are physically large, but also has application to general phased array implementations.

The design of a phased array antenna involves a decision on how the elements will be deployed, how the signals to or from the elements will be distributed, how the signals will be synchronised and how the array will be aligned or calibrated. Additionally an attractive proposition is to integrate the receiver or transmitter with each antenna element, which further complicates the distribution and synchronisation problem, by requiring many control and reference signals to be distributed. Many different schemes to address these issues exist, but all pose a significant problem when rapid deployment is required.

Problems that exist include the distribution of clean and phase coherent reference signals, the distribution of clean time synchronising signals, the deployment of multiple low loss cables, the accurate positioning of each antenna element, and the calibration of the array. The problem is how can the array be deployed rapidly and meet the distribution, synchronisation and calibration requirements. The preferred embodiment incorporates a synchronisation unit with each receiver/transmitter to eliminate the distribution, synchronisation and calibration problems above.

The preferred embodiment simplifies the deployment of a phased array antenna by implementing a synchronisation, reference, calibration and distribution system that is incorporated with each antenna element. This synchronisation unit allows the antenna elements to be connected by a simple daisy chained digital data link eliminating the need for multiple cables, and making the array simple to deploy (alternatively, a point-to-point radio link may be employed). All operations relating to synchronisation, reference, distribution and calibration are implemented via the data link. This adds significant complexity but greatly simplifies deployment. The invention allows the array to be rapidly deployed without the need for careful physical alignment. The antenna elements can be deployed at irregular intervals, and interconnected with a simple daisy chain cable, or other data transmission media, and the invention will allow the array to be calibrated, and synchronised automatically. The preferred embodiment comprises the antenna elements that make up the phased array plus a master unit that is used to manage the operations.

Figure 1:
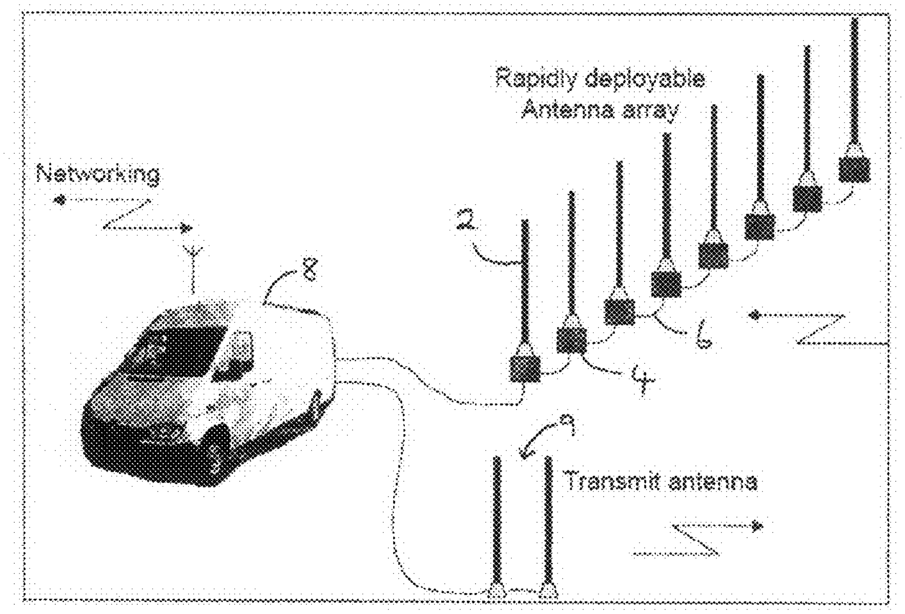
FIG. 1 is a schematic view of a known system of a rapidly re-deployable HF surface radar system.
Figure 2:
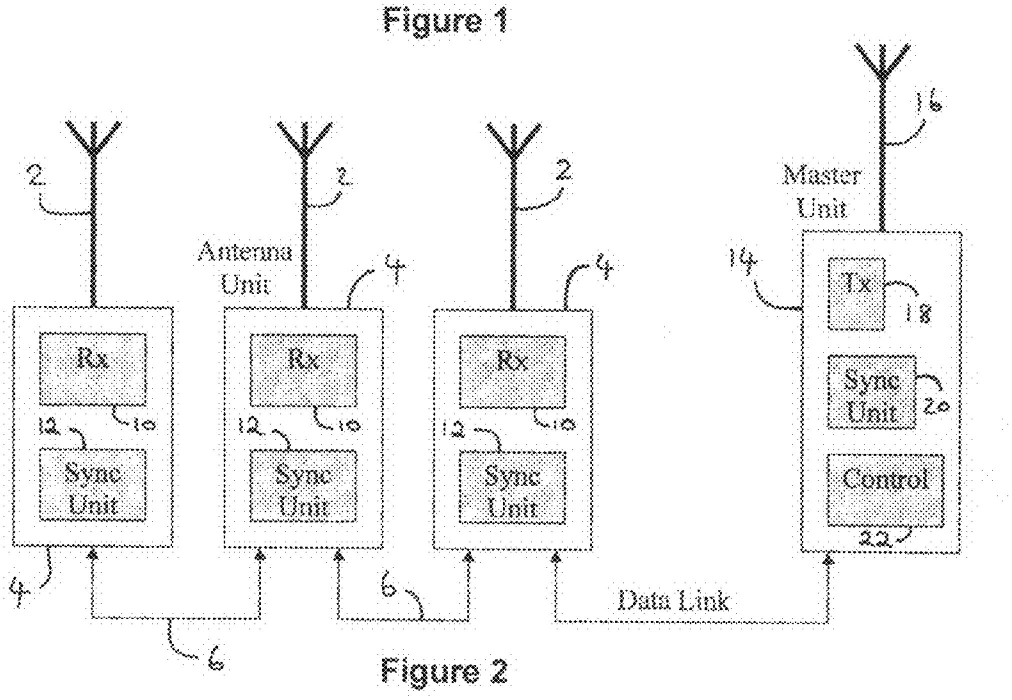
FIG. 2 is a schematic view of the preferred embodiment of the present invention.

Referring to FIG. 2, each antenna element 2, of a phased array receive antenna, has a receiver unit 4 including receiver circuitry 10 and a synchronisation unit 12. In addition active antenna circuitry is included, but not shown. The receiver units 4 are connected via data link cables 6 in a daisy chain arrangement to a master unit 14, which may conveniently located in a van. Master unit 14 includes an antenna 16 and a transmitter 18 for transmitting a low power phase reference signal to the antenna elements 2, as will be described. In addition a synchronisation unit 20 and a control unit 22 are provided.

In a modification for a transmitter antenna system, the receiver of each element would be replaced by a transmitter. In addition, the master unit would include a receiver for receiving phase synchronisation signals via the antenna 16.

The embodiment shown in FIG. 2 comprises building the receiver, and supporting local oscillator and timing generation, into each antenna element. Each unit thus contains its own means of generating timing and local oscillator signals, but each will be unsynchronised and what is required is a means of synchronising those signals and obtaining the position of the unit Each antenna unit hence incorporates a synchronisation unit (sync unit) 12. As will be described with reference to FIG. 4, the sync unit includes a satellite navigation receiver (GPS or other), a conditioned reference oscillator and local oscillator and timing generation. These units provide not only the position information, but also the infrastructure to achieve timing, frequency and phase synchronisation. The master unit incorporates a sync unit plus a control unit and a low power transmitter.

Figure 3:
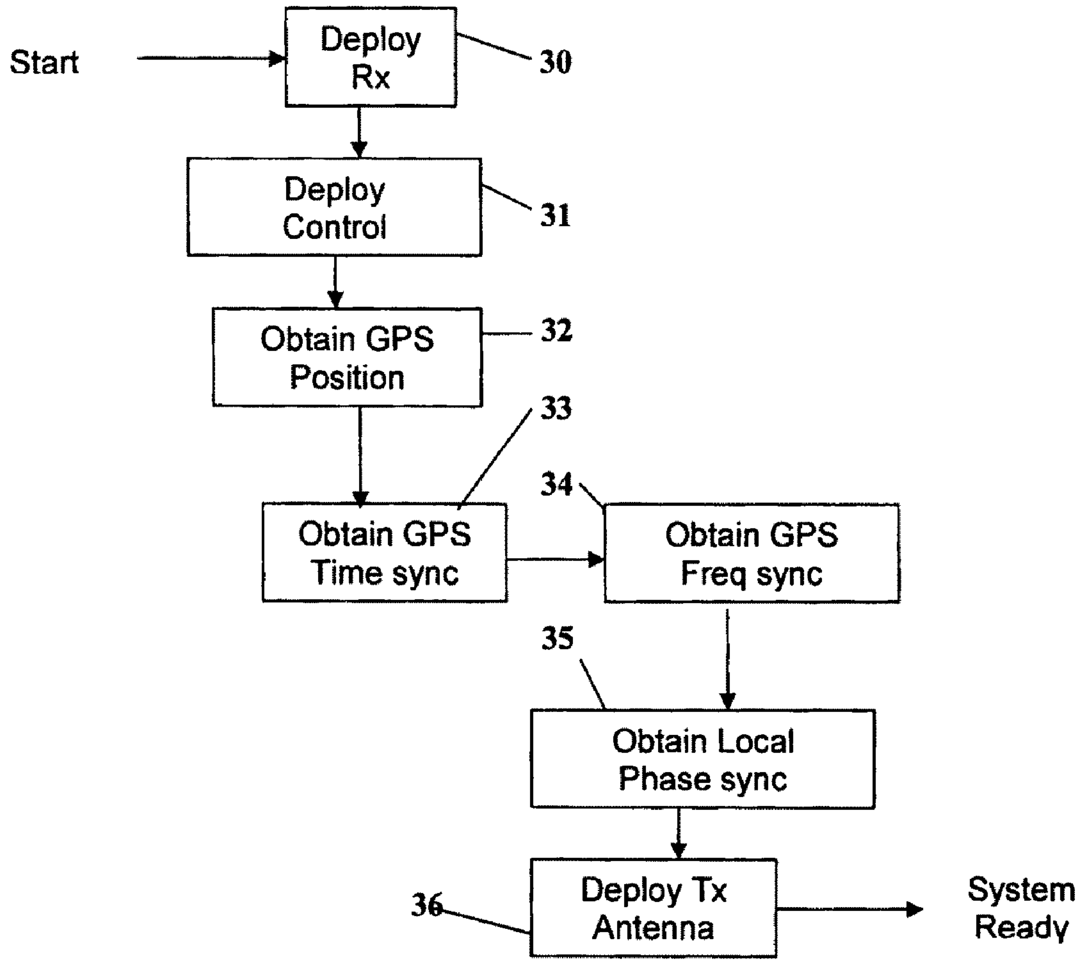
FIG. 3 is a flow chart illustrating steps in the deployment of an HF radar system according to the invention.

The sequence of operation for deployment of the antenna system is shown in FIG. 3. The antenna elements of a receiver phased array antenna are deployed as at 30 by driving a van to their intended positions, dropping off an element at each position from the van, and then driving to the next position. The elements are then connected by data link cables to the master control unit located in the van, which is parked in a desired position, and control is asserted by the master control unit as at 31. When initially deployed the antenna units and the master unit are in unknown locations, and the local oscillator and timing signals in each unit are unsynchronised. To calibrate and synchronise the array we need to obtain, Position information, Time synchronisation, Frequency synchronisation and Phase synchronisation.

The control unit first obtains the position of the master and antenna units using the satellite navigation receiver as at 32. Dependent upon the radar operating wavelength and the accuracy required, differential positioning and carrier phase methods may be used. This position information can be used to determine array alignment and beam forming coefficients.

The antenna units and master unit are then time synchronised as at 33 by using the time signals received by the satellite navigation receiver. For example the UTC coordinated 1 Pulse Per Second received by a GPS receiver can be obtained with less than 100 nano second uncertainty. This signal can be used to synchronise the generation of timing signals in each unit.

Frequency synchronisation as at 34 is required to ensure that each receiver or transmitter is tuned to exactly the same operating frequency, and that each unit does not drift relative to another. The signals received by the satellite navigation receiver are derived from high precision atomic references. In the case of GPS an accurate 1 Pulse Per Second signal is produced. This signal is compared with an equivalent signal derived from a local reference oscillator and the result is used to lock the local reference to the same frequency. Thus the local frequency reference in each antenna unit can be locked to the same satellite navigation transmission.

Phase synchronisation is required as at 35 to ensure that the receiver local oscillators in each antenna unit are locked to the same phase, so that the phased array radar will function correctly. Although the local frequency reference may be locked to the same frequency the phase may be different. To achieve phase synchronisation the master unit radiates a test signal using its low power transmitter, which is received by each antenna unit. This allows the received phase to measured at each receive element and compared, within the respective sync unit, to the expected phase determined from the known element positions. A phase correction can thus be deduced and applied.

The transmitter antenna system is then deployed as at 36. Although a single transmitter antenna element may commonly be used, in the less common case where a plurality of antenna elements are used, corresponding steps to 32-35 are carried out—except that for phase synchronisation, each antenna element will radiate a phase reference signal that is received by the master control unit.

Figure 4:
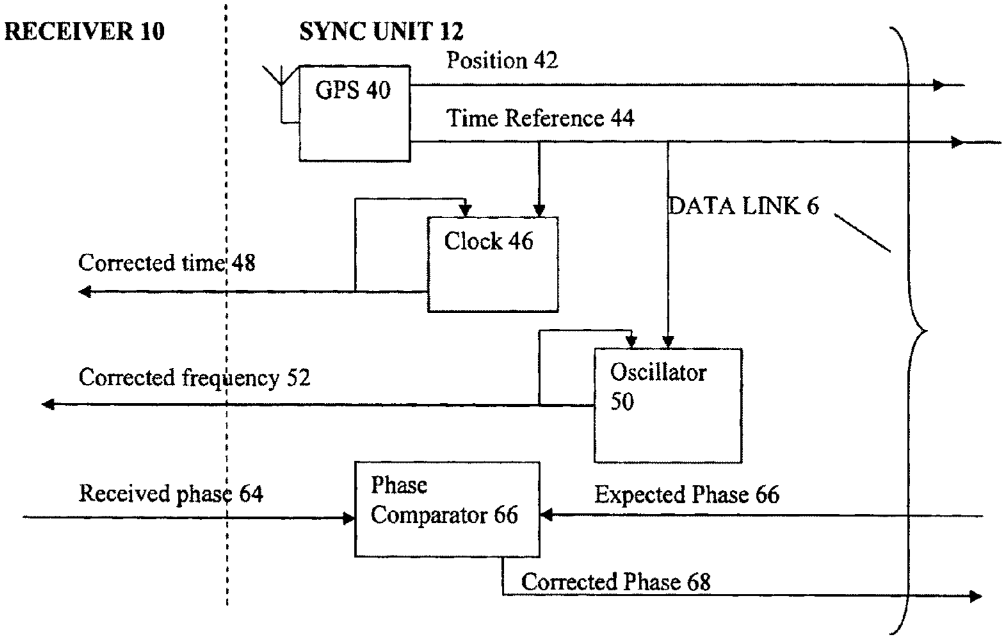
FIG. 4 is a schematic block diagram showing the sync unit of each receiver in more detail.

Referring now to FIG. 4, this shows in more detail those elements of a receiver unit 4 of an antenna element for carrying out the above procedure. Sync unit 12 comprises a GPS receiver 40 which provides position signals 42 and timing reference signals 44. These signals are fed to data link unit 6 for transmission to the master unit. In addition timing signal 44 is applied to a clock signal generating circuit 46 in order to generate a corrected time signal 48, which is applied to receiver 10.

Timing signal 44 is applied to a reference frequency oscillator 50 arranged in a locking arrangement such as a frequency locked loop or phase locked loop; the timing signal 44 is compared with an output frequency of the oscillator to provide a corrected frequency signal 52. This signal is applied to receiver 10.

In addition a means of synchronising and correcting receiver phase is provided. Transmitter 18 of master unit 14 transmits a low power transmitted signal which is detected by each antenna element. In addition, the master unit computes from the GPS position information of each receiver the expected phase of the transmitted signal in each receiver. This expected phase signal 62 is applied to each respective receiver. The actual received phase 64, after processing by the receiver, is compared with the expected phase in a phase comparator 66, and a corrected phase signal 68 is generated which is transmitted to master unit 14, and employed to ensure correct operation of the phased array radar.

The invention claimed is:

1. A deployable HF surface wave radar phased array antenna system, comprising:

a plurality of separate antenna elements which are movable relative to one another to desired spaced apart positions, each of the plurality of separate antenna elements including a respective RF processing arrangement, and a radio location arrangement for determining the location of each antenna element relative to other antenna elements of the system.

2. The system according to claim 1, wherein said radio location arrangement includes a receiver of a satellite radio navigation system.

3. The system according to claim 2, wherein said receiver of a satellite radio navigation system is arranged to provide timing signals for synchronizing the RF processing arrangement of each of the plurality of separate antenna elements in at least one of timing and frequency.

4. The system according to claim 1, further comprising:

a master control unit, wherein the master control unit and each of the plurality of antenna elements include a respective synchronization arrangement for synchronizing at least one parameter of the respective RF processing arrangement with said at least one parameter of the other RF processing arrangement.

5. The system according to claim 4, wherein the antenna elements are interconnected by a data link with the master control unit.

6. A deployable phased array antenna system, comprising:

a plurality of separate antenna elements which are movable relative to one another to desired spaced apart positions, each of the plurality of antenna elements including a respective RF processing arrangement; and a radio location arrangement for determining the location of each of the antenna elements relative to other antenna elements of the system, wherein the antenna elements are connected together and to the master control unit in a daisy chain arrangement.

7. The system according to claim 6, wherein the phased array antenna system includes an HF surface wave system.

* * * * *